United States Patent
Pieschel et al.

(10) Patent No.: US 6,761,272 B1
(45) Date of Patent: *Jul. 13, 2004

(54) FILTERS CONSISTING OF FILTER PAPER OR PAPER-TYPE NONWOVEN MATERIAL

(75) Inventors: Friedemann Pieschel, Wolfen (DE); Bckehard Lange, Köthen (DE); Michael Knieling, Berlin (DE)

(73) Assignee: Helmut Körber, Halle/S. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/980,155
(22) PCT Filed: May 20, 2000
(86) PCT No.: PCT/EP00/04589
§ 371 (c)(1),
(2), (4) Date: Nov. 28, 2001
(87) PCT Pub. No.: WO00/72940
PCT Pub. Date: Dec. 7, 2000

(30) Foreign Application Priority Data

May 28, 1999 (DE) .......................................... 199 24 435

(51) Int. Cl.⁷ .............................................. B01D 39/18
(52) U.S. Cl. .................... 210/504; 210/502.1; 210/503; 536/30; 536/31; 536/56; 536/62
(58) Field of Search ............................. 210/504, 502.1, 210/503–508; 536/30, 33, 54, 59, 62, 124, 127, 57, 31

(56) References Cited

U.S. PATENT DOCUMENTS

| 3,658,790 A | | 4/1972 | Bernardin |
| 5,698,265 A | * | 12/1997 | Mucalo et al. ............... 427/333 |
| 6,579,977 B1 | * | 6/2003 | Pieschel et al. ............... 536/30 |

FOREIGN PATENT DOCUMENTS

| GB | 838973 | 6/1960 |
| GB | 899284 | 6/1962 |
| GB | 914421 | 1/1963 |
| WO | WO 99 28372 | 6/1999 |

* cited by examiner

Primary Examiner—W. L. Walker
Assistant Examiner—Krishnan S. Menon
(74) Attorney, Agent, or Firm—Collard & Roe, P.C.

(57) ABSTRACT

Filters and methods for producing filter paper or paper-like nonwoven materially consisting partially or wholly of fibrous cellulose containing material. The filters provided are characterized by high filtration capacity and are capable of absorbing and binding undesirable foreign and attendant substances in the filter medium. The cellulose containing material of the is at least partially carbamided with urea and phosphorylated with phosphoric acid or ammonium phosphate until a nitrogen content in the form of carbamide groups of 1 to 4% and a phosphorous content of 3 to 8% are reached.

13 Claims, No Drawings

FILTERS CONSISTING OF FILTER PAPER OR PAPER-TYPE NONWOVEN MATERIAL

CROSS REFERENCE TO RELATED APPLICATIONS

Applicants claim priority under 35 U.S.C. §119 of German Application No. 199 24 435.9, filed on May 28, 1999. Applicants also claim priority under 35 U.S.C. §371 of PCT/EP00/04589, filed on May 20, 2000. The international application under PCT article 21(2) was not published in English.

The invention relates to filters consisting of filter paper or paper-type non-woven material. Said filters partially or wholly consist of fibrous material containing cellulose.

Filter paper is a type of paper produced from cellulose, plastic fibers or glass fibers and used for the filtration in households, technical applications and for analyses. Paper-type nonwoven materials are composite materials consisting of fibrous material containing cellulose. Filter bags, for example, or filter cartridges produced by winding or folding are manufactured from filter paper or paper-like nonwoven materials. The filters so produced are disposed of after they have been used once. In connection with filters used as one-way, disposable articles it is deemed desirable that such filters are biodegradable for reasons of environmental protection. This, however, is achieved only if the filters exclusively consist of cellulose.

Filters generally serve for separating solid particles from gases or liquids. Especially in connection with the filtration of aqueous media, however, it is frequently deemed desirable that certain ions can be jointly separated as well, either in order to achieve an additional purification effect or to obtain an enrichment in the filter paper. This relates in particular to toxic heavy metals as well as to hardening constituents in drinking water, as well as to the concentration of metal traces in larger water samples for the purpose of simpler analytical detection.

No fibers for filter materials have become known heretofore that have an adequate capacity for absorbing hardening constituents in order to effect a noticeable enhancement in the production of beverages in the presence of the usual degrees of water hardness, on the one hand, and which are capable of binding heavy metals with adequate strength so as to effect a notable flavor enhancement with the possible low concentrations on the other. Commercially available systems for improving the quality of drinking water, therefore, comprise a cartridge filled with ion exchangers as their core component. However, such cartridges are known to pose problems due to the multiplication of germs if there is no flow-through in the water system, and they load the environment because such cartridges can be recycled only incompletely.

The invention was based on the problem of providing filters consisting of filter paper or paper-type nonwoven material that are characterized by a high filtration capacity and are additionally capable of absorbing and binding undesirable foreign or attendant substances in the filter medium such as, for example hardening constituents or heavy metals. Furthermore, the problem of the invention is to provide suitable methods for producing the filters.

The problem is solved according to the invention by the features specified in claim 1. The features relating to the proposed methods for producing the filters are the objects of claims 2 to 13.

The filters made of filter paper or paper-like nonwoven material partially or wholly consist of fibrous material containing cellulose. The properties of the filters are substantially enhanced by a special treatment of the material containing cellulose, either prior to or after the manufacture of the filter paper. According to the invention, the treatment is carried out in such a manner that the material containing cellulose is at least partially carbamided with urea up to a nitrogen content of 1 to 4% by mass bonded in aminomethane acid ester groups (carbamide groups), and phosphorylated with phosphoric acid or ammonium phosphate up to a phosphorus content of 3 to 8% by mass. In addition to high filtration capacity, the filter produced from cellulose-containing material so modified additionally possess the special properties of binding hardening constituents as well as toxic heavy metals, which impair the flavor. An enhanced swelling property of the cellulose fibers is obtained by such a treatment, and a broader field of application is obtained in that way for the filters, which can be preferably employed for the separation of mechanical impurities from liquids and gases. In the case of aqueous solutions that need to be filtrated, the filters possess the advantageous property of exchanging the cations of ion-forming impurities for sodium or ammonium aluminum ions. Absorbed are in particular polyvalent cations (hardening constituents, heavy metals etc.) but also cationic tensides, quaternary organic ammonium compounds etc. Other fields of application include dust removal, water technology, in particular in water pipelines, and the use of the filters as air, coffee, smoke or dust filters.

From the treated cellulose fibers it is possible to produce in the manner known per se filter paper or paper-type nonwoven material either made exclusively of cellulose fibers or in mixture with other suitable starting materials for such filters such as, for example plastics or glass fibers.

It is then possible to produce from the filter paper or the paper-like nonwoven material different types of filters such as, for example filter bags or cartridge filters. The filters are used as one-way filters, as a rule. Filters exclusively consisting of cellulose and/or the modified cellulose-containing material as defined by the invention offer the advantage that they are completely biodegradable.

All fibers with a high cellulose content that are suitable for the manufacture of paper such as, for example cotton linters, sulfate and sulfite celluloses from various timbers, and fibers recycled from old paper can be used as cellulose fibers. The following possibilities are available with respect to the phosphorylation and carbamidation reaction:

Treatment of the entire cellulose-containing starting material prior to the manufacture of the filter paper or paper-containing nonwoven material;

treatment of a partial amount of the required cellulose starting material prior to the manufacture of the filter paper or paper-like nonwoven material, and subsequent mixing of said partial amount with untreated cellulose-containing fiber material; and manufacture of the filter paper or paper-like nonwoven material in the manner known per se, and subsequently treatment of the web of filter paper or paper-like nonwoven material by phosphorylation and carbamidation.

Different degrees of phosphorylation and carbamidation can be adjusted for the nitrogen and phosphorus contents within the specified range limits depending on the purpose of application of the filters.

The phosphorylation and carbamidation of the cellulose-containing starting material for the production of the filter paper or the paper-type nonwoven material is carried out under the following conditions:

It is important that the cellulose-containing fiber material is brought into a particularly reactive form prior to the phosphorylation and carbamidation reaction. Such a so-called activation is carried out by adjusting the moisture content of the cellulose-containing material by adding water to it in an amount of at least 30% by mass of the cellulose-containing material. The cellulose-containing starting material usually already has a water content of from 5 to 25%. In order to achieve the desired activation it is necessary that the cellulose-containing fiber material is subjected to the action of water over a longer period of time. The duration is substantially dependent upon the already existing moisture content of the material and amounts to at lest half an hour.

The reaction partners phosphoric acid or ammonium phosphate and urea have to be admixed to the cellulose-containing material in such a way that said reaction partners are present in the material with uniform distribution after the mixing process has been completed. In addition to the aforementioned activation, attention has to be paid in particular to a uniform distribution of the reaction partners in the cellulose-containing fiber material.

It is not absolutely necessary to maintain a defined sequence for adding the reaction partners.

The activation can be advantageously combined with the mixing of urea and/or phosphoric acid or ammonium phosphate. From the amounts of urea and/or phosphoric acid or ammonium phosphate and the amount of water required for the activation, a clear solution of said components is formed, if necessary under heating of up to 60° C. Said solution is used instead of water for activating the cellulose-containing fibrous material. In the course of the activation it is necessary only to make sure that no loss of water occurs.

An important step of the method consists in that prior to the actual phosphorylation and carbamidation, the moisture present in the reaction mixture for the purpose of activation is almost completely expelled. This is achieved by heating the mixture to temperatures of from 60° to 100° C. while applying a vacuum at the same time. Only once the water has been distilled off is it permissible to start the phosphorylation and carbamidation reaction, which is carried out by heating the mixture to a temperature of 125 to 155° C. while simultaneously applying a vacuum and maintaining a reaction time of at least 15 minutes.

Carrying out said reaction under vacuum leads to a number of decisive advantages of great importance is that the reaction temperature can be reduced by about 40° C. as compared to when it is carried out under normal pressure. Secondary reactions of phosphoric acid or ammonium phosphate and urea are distinctly reduced in this way, and decomposition reactions of the cellulose-containing fibrous material are suppressed. For example, it is possible, furthermore, to reduce the amounts of the reaction components urea and phosphoric acid or ammonium phosphate used. Furthermore, a careful treatment of the cellulose-containing material is assured as the phosphorylation and carbamidation is being carried out owing to the low reaction temperatures and reduced amounts of phosphoric acid or ammonium phosphate and urea used. In this way, the structures and mechanical properties of the cellulose-containing fibrous materials are preserved in the course of the reaction to a large extent, which is very important for the manufacture of the paper or nonwoven material.

Furthermore, it is important to maintain reaction times of at least 15 minutes. If the reaction times are shorter, the phosphoric acid used, for example, is reacted incompletely, and in particular the nitrogen content will be too low. Furthermore, it has been found that after excessively long reaction times, i.e. in excess of four hours, the absorption capacity clearly diminishes, whereby the known condensation reactions among the phosphate group to diphosphates etc. obviously take place. Upon expiration of the reaction time, the reaction product is cooled to normal temperature in the manner known per se, and the impurities are washed out.

The phosphoric acid or ammonium phosphate is preferably added to the activated cellulose-containing material first and uniformly distributed, and the urea subsequently. The mixing times for admixing the phosphoric acid or ammonium phosphate and the urea amount to 15 minutes each. The reaction components phosphoric acid or ammonium phosphate and urea can be mixed with the cellulose-containing material also at room temperature. Prior to the activation, the cellulose-containing material can be heated to the temperature of the solution of urea and/or phosphoric acid or ammonium phosphate in water.

Any desired technical quality can be used as phosphoric acid, in particular the commercially available 85% grade. Furthermore, instead of the total or part of the phosphoric acid it is possible also to use equivalent amounts of the ammonium phosphates. Urea is preferably suited in the pelletized form; however, any other technical, commercially available urea is suitable as well.

According to the proposed method, even only small amounts of urea and phosphoric acid or ammonium phosphate lead to fibers with high absorptive capacity. This applies to both the absorptive capacity and the strength with which in particular heavy metals are bound.

The phosphorylation and carbamidation of filter paper or paper-like nonwoven material that has already been produced previously in the form of webs from cellulose-containing material is carried out under the following conditions: said starting material is treated with a solution of phosphoric acid and/or ammonium phosphate and urea in water at a molar ratio of urea to phosphorus of 2.5:1 to 4.5:1, whereby the amount of water is adjusted in such a way that 1 to 8 mols phosphorus per kg cellulose remain in the cellulose-containing starting material. The starting material can be treated on one or both sides by coating it with the solution, or it is impregnated in a bath of the solution in a device operating in cycles.

The water is completely expelled by a subsequent vacuum treatment with simultaneous heating of the starting material to a temperature of 60° to 100° C. Thereafter, the phosphorylation and carbamidation reaction is carried out under vacuum as well, at a temperature of 125° to 155° C. and in the course of a reaction time of at least 15 minutes. The vacuum is preferably adjusted in each case to a value of 5.33 kPa to 26.66 kPa.

In connection with filters used in applications for drinking water, the present ammonium form is converted before the phosphorylated and carbamided cellulose-containing material is washed and dried into the sodium form by treating it with a solution of common salt. The treatment is carried out either on modified fibers prior to the actual manufacture of the paper, or on the modified filter paper or nonwoven material.

EXAMPLE 1

100 g cotton linters (linters 503 of the Buckeye Mephis Company) present in the form of cardboard-like webs was cut into pieces. In a dish, a solution prepared at 60° C. from 74.7 ml water, 61.4 g 85% phosphoric acid and 111.3 g urea was poured over said pieces and the dish was turned over frequently. After the solution was completely and uniformly absorbed, the dish was covered airtight and stored for one hour at room temperature. The dish was subsequently placed in a vacuum drying cabinet, a vacuum of 5.33 kPa was applied, and drying was carried out at 90° to 100° C. When no more steam was left to be removed by suction, the temperature was raised to 140° C. and maintained for 1.5 hours, whereby the vacuum was maintained as well. Obtained was 191.8 g of an externally unchanged reaction product, which was stirred into water, filtered off and washed until the wash water was free of phosphate. The product was dried in the drying cabinet at 110° C., whereby the yield came to 149.3 g.

A sample of the fiber material so obtained was converted by washing with concentrated common salt solution from the ammonium form into the sodium form, washed free of the salt, and subsequently dried. The elementary analysis of said specimen resulted in a phosphorus content of 5.6% by mass and a nitrogen content of 1.3% by mass.

The fiber material so prepared was subsequently tested for its sorptive properties.

The sorption equilibrium data were determined according to the following method:
250 ml measuring flasks were loaded with the fiber samples (0.1 to 0.025 g) and each charged with 1 to 5 ml m/10 solutions of salts of the metals Cu and Ca, filled up, provided with magnetic stirrers, and stirred for 3 hours at room temperature. Upon settlement, the solutions were decanted, their pH was determined, and the metal content was determined complexometrically. The equilibrium concentrations in the fiber were calculated based on the equilibrium concentrations in the solution so obtained and on the starting concentrations fixed by the addition of metal salt solutions. By adding corresponding amounts of nitric acid before the measuring flasks were filled up, the pH in the sorption was adjusted to pH=4.5. Several control measurements of the equilibrium concentrations in the solution by means of atom absorption spectroscopy (AAS) showed deviations in the range of the measuring accuracy and in this way confirmed the reliability of complexo-metric analyses in the sorption tests.

The sorption capacities so determined amounted to 100.1 mg Cu/g fiber for copper, and to 62.9 mg Ca/g fiber for calcium.

The strength of the absorption was determined with the help of equilibrium data at low equilibrium concentrations (below 10 mg/l) in the solution (at room temperature as well and at a pH of 4.5). For the sake of better clarity of the data, the usual metal-specific equilibrium coefficient $K_{Me}$ was calculated according to the formula $$K_{Me} = C_s/C_l.$$

Cs is in this connection the equilibrium concentration in the sorbent in mg/g, and Cl the equilibrium concentration of metal in the solution in mg/l. The following value was obtained for the fiber sample:

$$K_{Cu} = 47 \text{ l/g}.$$

The fiber sample was mixed with the same amount by weight of untreated cotton linters and processed to a filter paper in the conventional manner. A piece of said paper weighing 1.5 g (12 cm diameter) was used for filtering one liter of a tap water with 10.1° dH and a copper content of 0.3 mg/l. The result was a filtrate with 0.4° dH and a copper content of 0.01 mg/l.

EXAMPLE 2

100 g filter paper consisting of spruce cellulose for laboratory purposes, which was present in the form of sheets in the DIN A4-format, was placed on a substrate and uniformly coated with a solution of 28.3 g ammonium phosphate and 50.9 g urea in 126 ml water, whereby the entire amount of the solution was consumed. After 30 minutes, the substrates with the sheets were place in a vacuum drying cabinet, a vacuum of 6.67 kPa was applied, and all water was expelled by heating to 100° C. The temperature was raised within 30 minutes to 155° C. This temperature was maintained for 30 minutes, and venting and cooling was then carried out rapidly. The result was 137.7 g product, which could be washed free of phosphate by careful washing while preserving the original shape of the sheets. After the sheets were dried at 110° C. in the normal drying cabinet, 121.0 g treated filter paper was obtained as the result.

The elementary analysis following conversion into the Na-form as in example 1 showed a phosphorus content of 3.3% by mass and a nitrogen content of 1.9% by mass.

The sorption capacity determined analogous to example 1 showed for copper 66.7 mg Cu/g filter, and for calcium 44.1 mg Ca/g filter. The equilibrium coefficient for copper amounts to $$K_{Cu} = 46 \text{ l/g}.$$

One (1) liter tap water with a hardness of 16.2° dH and 0.1 mg copper/liter was filtrated through a round filter cut from the product. The filter had a diameter of 10 cm and a weight of 1.9 g. The filtrate then still had a hardness of only 4.6° dh and the copper content had dropped to 0.005 mg Cu/liter.

What is claimed is:

1. Filters consisting of filter paper or paper-type non-woven material which partially or wholly consist of fibrous material containing cellulose, characterized in that the cellulose-containing material is at least partially carbamided with urea and phosphorylated with phosphoric acid or ammonium phosphate until a nitrogen content in the form of carbamide groups of from 1 to 4% by mass and a phosphorus content of from 3 to 8% by mass is reached.

2. A method for producing filter paper or paper-type nonwoven material from fibrous, cellulose-containing material for filters according to claim 1, characterized by the following steps of the method:

(a) activation of the cellulose-containing material by adding water to it in an amount of at least 30% by mass of the cellulose-containing material and this moisture content is maintained for a duration of at least half an hour;

(b) addition of phosphoric acid or ammonium phosphate in an amount of 1 to 8 mols per kg anhydrous, cellulose-containing material;

(c) addition of urea at a molar ratio of urea to phosphoric acid or ammonium phosphate of 2.5:1 to 4.5:1;

(d) mixing of the components urea and phosphoric acid or ammonium phosphate with the activated, cellulose-containing material until the components are uniformly distributed;

(e) evaporation of the moisture contained in the mixture formed according to process steps (a) to (d) by heating the mixture to a temperature of 60° to 100° C. while simultaneously applying a vacuum;

(f) execution of a phosphorylating and carbamiding reaction by heating the mixture to a temperature of 125° to 155° C. while simultaneously applying a vacuum, maintaining a reaction time of at least 15 minutes; and (g) cooling of the reaction product to the normal temperature and washout of the impurities.

3. The method according to claim 2, characterized in that 30 to 100% by mass water is added for the activation and said moisture content is maintained for a duration of at least one hour and the phosphorylation and carbamidation is carried out by heating the mixture to a temperature of 125° to 145° C. while simultaneously applying a vacuum and maintaining a reaction time of one to four hours.

4. The method according to claim 2, characterized in that the phosphoric acid or ammoniumn phosphate is added to the activated, cellulose-containing material first and uniformly distributed, and the urea is added subsequently.

5. The method according to claim 2, characterized in that the mixing times for admixing the phosphoric acid or ammonium phosphate and the urea each amount to at least 15 minutes.

6. The method according to claim 2, characterized in that the reaction components phosphoric acid or ammonium phosphate and urea are mixed with the cellulose-containing material at room temperature.

7. The method according to claim 2, characterized in that phosphoric acid or ammonium phosphate and/or urea are mixed with the amount of water intended for the activation, and the solution so obtained is mixed with the cellulose-containing material for the activation.

8. The method according to claim 7, characterized in that the mixing of the phosphoric acid or ammonium phosphate and/or urea with the water is carried out under heating to temperatures of up to 60° C.

9. The method according to claim 7, characterized in that prior to the activation, the cellulose-containing material is heated to the temperature of the solution of urea and/or phosphoric acid or ammonium phosphate in water.

10. The method according to claim 2, characterized in that the cellulose-containing material is formed by a mixture of different celluloses.

11. A method for producing filter paper or paper-type nonwoven material from fibrous cellulose-containing material for filters according to claim 1, characterized by the following steps of the method:

(a) production of cellulose-containing filter paper or paper-like nonwoven material in the form of a web- or leaf-shaped starting material in the manner known per se;

(b) treatment of the starting material obtained according to process step (a) with a solution of urea and phosphoric acid and/or ammonium phosphate in water at a molar ratio of urea to phosphorus of 2.5:1 to 4.5:1, whereby the amount of water is adjusted in such a way that 1 to 8 mols phosphorus per kg cellulose remain in the cellulose-containing starting material, and the water content is maintained for a time duration of at least one half hour for activating the starting material;

(c) a subsequent vacuum treatment and heating of the starting material to a temperature of from 60° to 100° C. in order to completely expel the water;

(d) execution of a phosphorylation and carbamidation reaction of the starting material treated according to process steps (b)and (c) at a temperature of from 125° to 155° C. under vacuum in the course of a reaction time of at least 15 minutes; and (e) subsequent cooling and washing free of phosphate and final drying of the treated starting material.

12. The method according to claim 2, characterized in that the applied vacuum is adjusted to a value of 5.33 kPa to 26.66 kPa.

13. The method according to claim 2, characterized in that prior to washing and drying, the phosphorylated and carbamided cellulose-containing fiber material is converted from the ammonium form into the sodium form by treating it with a solution of common salt.

* * * * *

UNITED STATES PATENT AND TRADEMARK OFFICE
CERTIFICATE OF CORRECTION

PATENT NO.     : 6,761,272 B1
DATED          : July 13, 2004
INVENTOR(S)    : Pieschel et al.

It is certified that error appears in the above-identified patent and that said Letters Patent is hereby corrected as shown below:

Title page,
Item [75], Inventors, the name of the second inventor should correctly read:
-- Eckehard Lange --.

Signed and Sealed this

Thirtieth Day of November, 2004

JON W. DUDAS
*Director of the United States Patent and Trademark Office*